United States Patent
Ikegami

(10) Patent No.: US 11,636,598 B2
(45) Date of Patent: Apr. 25, 2023

(54) IMAGING DATA PROCESSING APPARATUS AND IMAGING DATA PROCESSING PROGRAM TO PERFORM IMAGE ALIGNMENT BY DEFORMING IMAGES SUCH THAT IMAGED OBSERVATION TARGET SITES COINCIDE

(71) Applicant: Shimadzu Corporation, Kyoto (JP)

(72) Inventor: Masahiro Ikegami, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 212 days.

(21) Appl. No.: 16/964,522

(22) PCT Filed: Mar. 30, 2018

(86) PCT No.: PCT/JP2018/013596
§ 371 (c)(1),
(2) Date: Jul. 23, 2020

(87) PCT Pub. No.: WO2019/186999
PCT Pub. Date: Oct. 3, 2019

(65) Prior Publication Data
US 2021/0035299 A1 Feb. 4, 2021

(51) Int. Cl.
*G06T 7/00* (2017.01)
*G06T 7/11* (2017.01)
(Continued)

(52) U.S. Cl.
CPC ............ *G06T 7/0014* (2013.01); *G06T 7/11* (2017.01); *G06T 7/30* (2017.01); *H01J 49/0004* (2013.01);
(Continued)

(58) Field of Classification Search
None
See application file for complete search history.

(56) References Cited

U.S. PATENT DOCUMENTS

2011/0267340 A1 11/2011 Kraus et al.
2015/0301323 A1 10/2015 Noda et al.
(Continued)

FOREIGN PATENT DOCUMENTS

JP 2009-25275 A 2/2009
WO 2014/076789 A1 5/2014
(Continued)

OTHER PUBLICATIONS

Yamaguchi, Analysis-Data Processing Device, 2015, English Translation of WO-2015181893,p. 1-48. (Year: 2015).*
(Continued)

*Primary Examiner* — Gandhi Thirugnanam
(74) *Attorney, Agent, or Firm* — Muir Patent Law, PLLC

(57) ABSTRACT

In a data processing unit, alignment is performed by appropriately deforming one image among MS imaging images acquired from different samples so that positions and sizes on the MS imaging image are matched (S1 to S5). When the aligned image is displayed on a screen of a display unit and a user sets a region of interest on the image serving as a reference (S6), a micro region including a center point within a range of the set region of interest is extracted in each of an image serving as the reference and an image not serving as the reference (S7). In the image subjected to image deformation, although the shape of each micro region is distorted and micro regions are not arranged in an orderly grid manner, by assuming that the micro regions in which the center point is included within the range of the region of interest is included in the range of the region of interest, it is possible to perform a comparative analysis based on the data value within an appropriate micro region corresponding to the region of interest regardless of the image deformation.

6 Claims, 6 Drawing Sheets

(51) Int. Cl.
*G06T 7/30* (2017.01)
*H01J 49/00* (2006.01)
*H01J 49/16* (2006.01)

(52) U.S. Cl.
CPC .......... *H01J 49/004* (2013.01); *H01J 49/164* (2013.01); *G06T 2207/10056* (2013.01); *G06T 2207/20104* (2013.01); *G06T 2207/30024* (2013.01)

(56) References Cited

U.S. PATENT DOCUMENTS

| | | | | |
|---|---|---|---|---|
| 2016/0302659 | A1* | 10/2016 | Boss | A61B 3/103 |
| 2020/0357122 | A1* | 11/2020 | Yamaguchi | G06T 11/203 |
| 2021/0035299 | A1* | 2/2021 | Ikegami | H01J 49/004 |

FOREIGN PATENT DOCUMENTS

| | | | | |
|---|---|---|---|---|
| WO | 2015/181893 | A1 | 12/2015 | |
| WO | WO-2015181893 | A1 * | 12/2015 | ............ G01N 27/62 |
| WO | 2019/186965 | A1 | 10/2019 | |

OTHER PUBLICATIONS

Extended European Search Report dated Mar. 12, 2021 for the corresponding European Patent Application No. 18912093.4.

Pallua et al., "MALDI-MS tissue imaging identification of biliverdin reductase B overexpression in prostate cancer", Journal of Proteomics, Elsevier, Amsterdam, NL, vol. 91, Aug. 14, 2013 (Aug. 14, 2013), pp. 500-514, XP028766413.

Bocklitz et al., "Deeper Understanding of Biological Tissue: Quantitative Correlation of MALDI-TOF and Raman maging", Analytical Chemistry, vol. 85, No. 22, Nov. 19, 2013 (Nov. 11, 2013), pp. 10829-10834, XP055273080.

Written Opinion for PCT application PCT/JP2018/013596 dated Jun. 26, 2018, submitted with a machine translation.

"IMScope TRIO imaging mass microscope," [online], [Searched on Mar. 28, 2018, downloaded on May 29, 2020], Shimadzu Corporation, Internet <URL: http://www.an.shimadzu.co.jp/bio/imscope/>, with its machine translation.

Ogata et al., "Metabolomic Analysis Using an iMScope Imaging Mass Microscope," Shimadzu Review Editorial Department, Shimadzu Review, vol. 70, No. 3-4, published on Mar. 31, 2014, with its machine translation.

Hare et al., "Three-Dimensional Atlas of Iron, Copper, and Zinc in the Mouse Cerebrum and Brainstem," (Analytical Chemistry), 2012, vol. 84, pp. 3990-3997.

Abdelmoula et al., "Automatic Registration of Mass Spectrometry Imaging Data Sets to the Allen Brain Atlas," Analytical Chemistry, 2014, vol. 86, pp. 3947-3954.

First Office Action dated Dec. 5, 2022 issued for the corresponding Chinese Patent Application No. 201880091068 1.

\* cited by examiner

IMAGING DATA PROCESSING APPARATUS AND IMAGING DATA PROCESSING PROGRAM TO PERFORM IMAGE ALIGNMENT BY DEFORMING IMAGES SUCH THAT IMAGED OBSERVATION TARGET SITES COINCIDE

TECHNICAL FIELD

The present invention relates to an imaging data processing apparatus for processing data acquired by performing a predetermined analysis on each of a number of micro regions within a two-dimensional measurement region on a sample and data acquired for each micro region by processing the data, and a data processing program for performing the processing on a computer. More particularly, the present invention relates to an imaging data processing apparatus and an imaging data processing program for setting a region of interest (ROI=Region Of Interest) which to be particularly focused on by a user or important for observation on an image produced based on data for each micro region within a measurement region.

BACKGROUND OF THE INVENTION

A mass spectrometric imaging method is a method for examining a spatial distribution of a substance having a specific mass by performing mass spectrometry on a plurality of micro regions (measuring points) within a two-dimensional measurement region on a sample such as a biological tissue section, and has been actively applied to a drug discovery, a biomarker search, and an investigation of causes of various diseases. A mass spectrometer for performing mass spectrometric imaging is commonly referred to as an imaging mass spectrometer (see, e.g., Non-Patent Documents 1 and 2).

In an imaging mass spectrometer, in general, mass spectrum data (including $MS^n$ spectrum data where "n" is equal to or greater than 2) over a predetermined mass-to-charge ratio (m/z) range for each of a number of micro regions on a sample is acquired. When a user designates a m/z value of an ion derived from a compound to be observed, the signal strength value corresponding to the m/z value designated in each micro region is extracted in the data processing unit of the imaging mass spectrometer. Then, a two-dimensional image in which the signal strength value is visualized according to a grayscale or a color scale and associated with the position of the micro region (mass spectrometry imaging image, hereinafter referred to as "MS imaging image") is generated and displayed on a display unit screen.

In recent years, by observing the samples excised from a biological tissue using such an imaging mass spectrometer, studies have been actively conducted to investigate differences of distributions of compounds in various internal organs and organs in a living body and/or differences of distributions of compounds in a pathological site and a healthy site. In performing such measurements and analyses, there are often cases in which it is desired to compare the distributions of a certain compound between a plurality of samples. For example, in the field of a drug research/development, there are often cases in which it is desired to use a section cut out of an organ of an experimental animal such as a mouse as a sample and compare the changes in the condition of the diseased tissue occurred at a particular site in the organ with respect to whether or not a drug has been administered, the difference in the type and quantity of the administered drug, and the elapsed time after the drug administration. In such cases, by comparing the MS imaging image corresponding to a particular compound in the same organ taken from a mouse that differs in the condition of the drug administration, it is possible to grasp the changes in the diseased tissue that cannot be grasped by an optical microscopic observation alone.

Recently, an attempt has been made to generate a three-dimensional MS imaging image by performing imaging mass spectrometry on each of a plurality of slice samples sliced continuously from an organ of a mouse (hereinafter referred to as "continuous slice sample") and stacking the two-dimensional MS imaging images in each slice sample (see, e.g., Non-Patent Document 3).

As described above, in the case of comparing the mass spectrometry imaging data acquired from samples collected from the same site of the same organ of different experimental animals, even in the same site of the same organ, there are individual differences, and therefore, it is inevitable that there are some differences in the shapes and sizes of the regions to be compared. Even in continuous slice samples cut out from the same organ of the same individual, the shapes and sizes of the measurement target sites are not completely the same, and there are usually some differences. Therefore, when performing processing of a comparative analysis of mass spectrometry imaging data derived from a plurality of samples and performing processing of superimposing mass spectrometry imaging image data derived from continuous slice samples, it is necessary to perform the alignment of the MS imaging images so that the positions, sizes, shapes, etc., of the same site are aligned as much as possible.

Conventionally, it has been common that a user performs the alignment by manually performing the image deformation processing, such as, e.g., moving, rotating, enlarging/reducing, and nonlinear deforming, while confirming a plurality of MS imaging images which are alignment targets on a display screen. However, these tasks are very cumbersome and less efficient. In addition, it has been difficult to perform the accurate alignment between MS imaging images because an MS imaging image indicates the intensity distribution of an ion derived from a compound having a certain mass, that is, the distribution of abundances, and does not necessarily indicate the contour or boundary of a certain site or a tissue structure.

On the other hand, in Patent Document 1, Non-Patent Document 4, etc., a method has been disclosed in which a plurality of MS imaging images to be subjected to a comparative analysis or a superposition processing are deformed to perform the alignment so as to match the positions, sizes, shapes, etc., of the sites estimated to be the same. However, even when the alignment is performed by deforming one or a plurality of images using such methods, the following problems arise.

In cases where a plurality of MS imaging images is compared, there are many cases in which only a partial region within an image is a region to be focused on. Therefore, a user (operator) often sets one or a plurality of region of interests (ROIs) having an appropriate size and range on one MS imaging image after the alignment, performs a multivariate analysis, such as, e.g., a principal component analysis, a least square regression analysis, and a discriminant analysis, using mass spectrum data in a micro region included in the region of interest, and performs an analysis by a hypothesis test. In order to perform such an analysis accurately, it is essential that a region of interest of the same range as a region of interest set on an MS imaging image for one sample be set accurately on MS imaging images for other samples. As a method for automatically setting such a region of interest, a method described in Patent Document 2 is known.

In the method described in Patent Document 2, in cases where the alignment of images is performed by a relatively straightforward modification, such as, e.g., moving, rotating, etc., an appropriate region of interest can be set on MS imaging images for other samples. However, particularly in cases where the sample is a biological tissue section, the image is deformed considerably more complicatedly when the alignment is performed. Therefore, even if the positions, sizes, shapes, etc., of the region of interests are apparently substantially the same in a plurality of MS imaging images, the pixels corresponding to the region of interest set by a user are not always included in the automatically set region of interest accurately in the pixel unit corresponding to the micro region. For this reason, when a multivariate analysis or a hypothesis test is performed based on the mass spectrum data of the pixels included in the region of interest, there is a possibility that data in micro regions actually deviating from the region of interest is used for the analysis and therefore the analysis accuracy is deteriorated.

The above-described problems are not limited in the case of performing mass spectrometric imaging, and the same can be applied to a comparative analysis or a differential analysis using imaging data acquired by other measuring methods or observing methods such as, e.g., Raman spectroscopic imaging and infrared spectroscopic imaging.

PRIOR ART DOCUMENT

Patent Document

Patent Document 1: Japanese Unexamined Patent Application Publication No. 2009-25275
Patent Document 2: International Publication No. 2014/076789 pamphlet Non-Patent Document Non-Patent Document 1: "iMScope TRIO imaging mass microscope," [online], [Searched on Mar. 28, 2018], Shimadzu Corporation.
Non-Patent Document 2: Katsuji OGATA and eight others, "Metabolome Analysis by imaging mass microscope iMScope," Shimadzu Review Editorial Department, Shimadzu Review, Vol. 70, No. 3-4, published on Mar. 31, 2014.
Non-Patent Document 3: Hare (Dominic. J. Hare) and seven others, "Three-Dextmensional Atlas of Iron, Copper, and Zinc in the Mouse Cerebrum and Brainsten," (Analytical Chemistry), 2012, Vol. 84, pp. 3990-3997.
Non-Patent Document 4: Walid M. Abdelmoula and nine others, "Automatic Registration of Mass Spectrometry Imaging Data Sets to the Allen Brain Atlas," Analytical Chemistry, 2014, Vol. 86, pp. 3947-3954.

SUMMARY OF THE INVENTION

Problems to be Solved by the Invention

The present invention has been made in view of the above-described problems, and an object of the present invention is to provide an imaging data processing apparatus and an imaging data processing program capable of accurately setting a region of interest on an image corresponding to each sample when setting a region of interest on an image based on imaging data to perform a comparative analysis or a differential analysis of imaging data such as a plurality of mass spectrometry imaging data, etc., each acquired from different samples.

Means for Solving the Problem

An imaging data processing apparatus according to a first aspect of the present invention made to solve the above-described problems is an imaging data processing apparatus for processing imaging data which is a set of data acquired by performing a predetermined analysis or observation in each of a plurality of micro regions within a two-dimensional measurement region on a sample, wherein the imaging data processing apparatus performs processing of imaging data acquired for each of a plurality of samples in which observation target sites are the same or similar to each other, or imaging data acquired by different analyses or observation methods or under different parameters for one sample in which observation target sites are the same, the imaging data processing apparatus comprising:

a) an image alignment processing unit configured to perform deformation processing accompanied by a movement of a position of each micro region in an image other than an image serving as a reference for one or a plurality of acquired samples so that the same or similar sites coincide with each other with one of a plurality of images generated based on a plurality of imaging data which is a processing target served as the reference;

b) a region of interest setting reception unit configured to make a user set a region of interest on one image among an image served as the reference by the image alignment processing unit and an image deformed by the image alignment processing unit; and c) a region of interest correspondence micro region determination unit configured to determine a micro region included in the region of interest in each image by regarding a micro region existing within a frame of the region of interest in which a center point of the micro region moved at a time of the processing by the image alignment processing unit is set by the region of interest setting reception unit as a micro region included in the region of interest, in an image other than an image in which the region of interest is set by the region of interest setting acceptance unit among the plurality of images processed by the image alignment processing unit and the image served as the reference.

An imaging data processing program according to a first aspect of the present invention made to solve the above-described problems is an imaging data processing program for processing imaging data which is a set of data acquired by performing a predetermined analysis or observation in each of a plurality of micro regions within a two-dimensional measurement region on a sample, wherein the imaging data processing program performs processing of imaging data acquired for each of a plurality of samples in which observation target sites are the same or similar to each other, or imaging data acquired by different analyses or observation methods or under different parameters for one sample in which observation target sites are the same, the imaging data processing program make a computer function as:

a) an image alignment processing function part configured to perform deformation processing accompanied by a movement of a position of each micro region in an image other than an image serving as a reference for one or a plurality of acquired samples so that the same or similar sites coincide with each other with one of a plurality of images generated based on a plurality of imaging data which is a processing target served as the reference;

b) a region of interest setting reception function part configured to make a user set a region of interest on one image among an image served as the reference by the image alignment processing function part and an image deformed by the image alignment processing function part; and c) a region of interest correspondence micro region determination function part configured to determine a micro region included the region of interest in each image by regarding a micro region existing within a frame of the region of interest in which a center point of a micro region moved at a time of the processing by the image alignment processing function part is set by the region of interest setting reception function part as a micro region included in the region of interest, in an image other than an image in which the region of interest is set by the region of interest setting acceptance function part among the plurality of images after the processing by the image alignment processing function part and the image served as the reference.

The imaging data of the processing target of the present invention can be data in each of a plurality of micro regions in a two-dimensional measurement region on a sample acquired by various microscopes, such as, e.g., an optical microscope, a phase contrast microscope, and a confocal microscope, a Fourier transform infrared spectrophotometric imaging apparatus, a Raman spectroscopic imaging apparatus, an electron probe micro analyzer as well as an imaging mass spectrometer. The imaging data to be subjected to the image alignment may be data acquired by the same analysis or observation method or may be data acquired by different analyses or observation methods.

Further, even in cases where either imaging data is set as a processing target, the image alignment processing unit uses one data value (e.g., signal strength value) per one micro region for the image alignment. Therefore, when there is a data value about a plurality of components such as R, G, and B, which are three primary colors of color per micro region (pixel) like an optical microscope, etc., the data value of one component that best represents the characteristics of the image is selected, or the data value of a component acquired by synthesizing the plurality of components into one component is used. Further, even in cases where there is a data value about a number of components (mass-to-charge ratio and wavelength) per micro region like in an imaging mass spectrometer or a Fourier transform infrared spectrophotometric imaging apparatus, it is preferable to select a data value of one component among them, or to perform a multivariate analysis such as a principal component analysis for each micro region to use a score value, etc., of a typical principal component as a data value of the micro region.

In the imaging data processing apparatus according to the first aspect of the present invention, for example, in cases where imaging mass spectrometry data acquired by measuring two samples by an imaging mass spectrometer is a processing target, the image alignment processing unit performs an image alignment so that the same site coincides by performing the processing of deforming the MS imaging image in the same mass-to-charge ratio for another sample with the image, i.e., MS imaging image, generated based on the data value (signal strength value) in the mass-to-charge ratio of one characteristic component as described above for one sample as a reference. At the time of this image deformation, for example, a linear affine transformation, such as, e.g., translation, rotation, enlargement, and reduction, or a nonlinear transformation such as a B-spline method, may be used. In either case, when one of images is deformed to match the pattern of the image, the position of each micro region constituting the image will be moved.

Note that, even in the case of performing the alignment between MS imaging images, the deformation information of the image for performing the alignment may not necessarily be acquired from the MS imaging image. Since the MS imaging image is an image that generally indicates the distribution of compounds having a particular mass, there is a case that the image does not accurately show the outline of a certain site in a particular biological tissue. The image alignment can be easily performed and the image alignment can be performed more accurately in the case of an image in which the external features (in other words, the visual features) of the sample are clear. Therefore, in cases where an optical microscope image on the same sample can be acquired together with imaging mass spectrometry data, it may be configured such that the image deformation information for alignment is acquired using an optical microscope image and an MS imaging image is deformed using the acquired deformation information.

The region of interest setting reception unit display one of an image set as a reference by the image alignment processing unit, that is a non-deformed image, and a deformed image and makes a user set a region of interest on the image. As described above, in cases where image deformation information for alignment is acquired using an optical microscope image and an MS imaging image, etc., is deformed based on the deformation information, it may be configured such that the original optical microscope image is considered to be an image serving as a reference and the image is used to set the region of interest. Note that the region of interest setting reception unit is enough to recognize the range designated on the image by the user's operation of a pointing apparatus such as a mouse as a region of interest.

Since the image serving as a reference has not been deformed by the image alignment processing unit, the positions of the respective micro regions constituting the image are the same as those at the time of the measuring. On the other hand, in images other than the image serving as a reference, there is a possibility that the micro region was moved when the image was deformed by the image alignment processing unit. Therefore, in the apparatus according to the first aspect of the present invention, the region of interest correspondence micro region determination unit sets the region of interest at the same position as the region of interest on the image in which the region of interest is set in all images to be compared including the image serving as a reference and images after the deformation processing, and regards micro regions in which the center point exists within the frame of the region of interest as a micro region included in the region of interest. If a micro region is not moved by the image deformation processing, the center point of the micro region does not move. Therefore, the micro region included within the frame of the region of interest on each image is identical to that of the image in which the region of interest is set. On the other hand, in cases where the micro region is largely moved by the image deformation processing, there is a possibility that the center of interest not included in the region of interest in the image in which the region of interest is set in the images other than the image in which the region of interest is set exists within the range of the region of interest. In such a case, in some cases, the micro regions included in the region of interest partially differ from those of the image in which the region of interest is set.

As described above, according to the first aspect of the present invention, even in cases where the position of each micro region from which the imaging data is acquired has been moved on the image due to the image deformation processing at the time of the image alignment, it is possible to accurately extract the micro regions included in the region of interest set by the user. In this manner, in all of the comparative analysis target images and/or the differential analysis target images including deformation processed images, it is possible to perform a multivariate analysis and/or a hypothesis test based on the data acquired in micro regions accurately included in the region of interest set by the user.

Further, an imaging data processing apparatus according to the second aspect of the present invention made to solve the above-described problem is an imaging data processing apparatus for processing imaging data which is a set of data acquired by performing a predetermined analysis or observation in each of a plurality of micro regions within a two-dimensional measurement region on a sample, wherein the imaging data processing apparatus performs processing of imaging data acquired for each of a plurality of samples in which observation target sites are the same or similar to each other, or imaging data acquired by different analyses or observation methods or under different parameters for one sample in which observation target sites are the same, the imaging data processing apparatus comprising:

a) an image alignment processing unit configured to perform deformation processing accompanied by a movement of a position of each micro region in an image other than an image serving as a reference for one or a plurality of acquired samples so that the same or similar sites coincide with each other with one of a plurality of images generated based on a plurality of imaging data which is a processing target served as the reference;

b) a region of interest setting reception unit configured to make a user set a region of interest on one image among an image served as the reference by the image alignment processing unit and an image deformed by the image alignment processing unit; and c) a data value within region of interest operation unit configured to calculate a data value at a position corresponding to a center point of a micro region existing within a frame of the region of interest set by the region of interest setting reception unit on an image in which the region of interest is set, by interpolation processing using a data value at a position of the center point of each of a plurality of micro regions moved at the time of the processing by the image alignment processing unit, within a frame of the region of interest corresponding to the region of interest set by the region of interest setting reception unit on an image other than an image in which the region of interest is set by the region of interest setting acceptance unit among the plurality of images after the processing by the image alignment processing unit and the image served as the reference, and adopt the calculated value as a data value of each virtual micro region included in the region of interest on an image other than an image in which the region of interest is set.

Further, an imaging data processing program according to the second aspect of the present invention made to solve the above-described problem is an imaging data processing program for processing imaging data which is a set of data acquired by performing a predetermined analysis or observation in each of a plurality of micro regions within a two-dimensional measurement region on a sample, wherein the imaging data processing program performs processing of imaging data acquired for each of a plurality of samples in which observation target sites are the same or similar to each other, or imaging data acquired by different analyses or observation methods or under different parameters for one sample in which observation target sites are the same, the imaging data processing program make a computer function as:

a) an image alignment processing function part configured to perform deformation processing accompanied by a movement of a position of each micro region in an image other than an image serving as a reference for one or a plurality of acquired samples so that the same or similar sites coincide with each other with one of a plurality of images generated based on a plurality of imaging data which is a processing target served as the reference;

b) a region of interest setting reception function part configured to make a user set a region of interest on one image among an image served as the reference by the image alignment processing function part and an image deformed by the image alignment processing function part; and c) a data value within region of interest operation function part configured to calculate a data value at a position corresponding to a center point of a micro region existing within a frame of the region of interest set by the region of interest setting reception function part on an image in which the region of interest is set, by interpolation processing using a data value at a position of the center point of each of a plurality of micro regions moved at the time of the processing by the image alignment processing function part, within a frame of the region of interest corresponding to the region of interest set by the region of interest setting reception function part, on an image other than an image in which the region of interest is set by the region of interest setting acceptance function part among the plurality of images after the processing by the image alignment processing function part and the image served as the reference, and adopt the calculated value as a data value of each virtual micro region included in the region of interest on an image other than an image in which the region of interest is set.

In the second aspect of the present invention, the processing by the image alignment processing unit and the region of interest setting reception unit are exactly the same as those in the first aspect of the present invention. When a region of interest is set on an image serving as a reference or one image after the deformation, in the second aspect of the present invention, the data value within region of interest operation unit calculates, by an interpolation operation, a data value in a virtual micro region included in the region of interest corresponding to the region of interest set by the region of interest setting reception unit on other images other than the image in which the region of interest is set. The term "virtual micro region" is used here because the actual micro region is normally moved at the time of the image deformation, so there is a high possibility that the position of the micro region on the image in which the region of interest is set is not the same as the position of the region of interest on other images, but the actual micro region is a micro region regarded that the micro region is not moved, in other words, a micro region when the region of interest is positioned at the same position as the image in which the region of interest is set.

Specifically, the data value within region of interest operation unit calculates the data value at the position of the center point of a virtual micro region within the region of interest by interpolation processing based on the data value at the positions of the center points of the plurality of micro regions in a state in which the micro regions are moved by the image deformation. The method of the interpolation processing is not particularly limited. Further, it is not limited the number of data values in the surrounding micro regions in a moved state to be used for the purpose of determining the data value at the position of the center point of a certain micro region. However, there is a high possibility that the center points of the plurality of micro regions in a state moved by the image deformation are not aligned on a straight line and that there is a high possibility that they are not equally spaced. Therefore, it is desirable to use a method capable of performing the interpolation with high accuracy even under such a condition. Thus, the data value within region of interest operation unit obtains, by the interpolation processing, the data value at the position of the center point of the virtual micro region in the region of interest on each image except for the image in which the region of interest is set. Then, the virtual micro region in which the center point exists within the frame of the region of interest is regarded as a micro region included in the region of interest. Note that as for the image in which the region of interest is set, it is enough to simply set the micro region in which the center point exists within the frame of the region of interest to be a micro region included in the region of interest.

In this manner, also in the second aspect according to the present invention, even in cases where the position of each micro region from which imaging data is acquired has been moved on the image due to the image deformation at the time of the image alignment, it is possible to accurately extract the micro region included in the region of interest set by the user. In this manner, in all of the comparative analysis target images and the differential analysis target images including the deformation processed images, it is possible to perform a multivariate analysis and a hypothesis test based on the data acquired in the micro region accurately included in the region of interest set by the user.

Further, in the case of setting the region of interest on the image subjected to the deformation processing by the image alignment processing unit, if the shape of the micro region becomes not rectangular due to the transformation, there are some cases that it is difficult to display the image as it is on the screen of the display unit. Therefore, in this case, it is preferable to perform the interpolation processing based on the data value of each micro region after the deformation to display the image in which the shape of each micro region is apparently shaped into a rectangular shape, so that the setting of the region of interest can be performed on the image.

Further, an imaging data processing apparatus according to the third aspect of the present invention made to solve the above-described problem is an imaging data processing apparatus for processing imaging data which is a set of data acquired by performing a predetermined analysis or observation in each of a plurality of micro regions within a two-dimensional measurement region on a sample, wherein the imaging data processing apparatus performs processing of imaging data acquired for each of a plurality of samples in which observation target sites are the same or similar to each other, or imaging data acquired by different analyses or observation methods or under different parameters for one sample in which observation target sites are the same, the imaging data processing apparatus comprising:

a) an image alignment processing unit configured to perform deformation processing accompanied by a movement of a position of each micro region in an image other than an image serving as a reference for one or a plurality of acquired samples so that the same or similar sites coincide with each other with one of a plurality of images generated based on a plurality of imaging data which is a processing target served as the reference;

b) a region of interest setting reception unit configured to divide one image selected by a user among images deformed by the image alignment processing unit into predetermined micro regions, calculate a data value corresponding to a center point of each micro region by interpolation processing using a data value at a position of the center point of each of a plurality of micro regions moved at the time of the deformation processing by the image alignment processing unit, and display the image based on the data value calculated by the interpolation processing to allow the user to set a region of interest on the image;

c) a data value within region of interest operation unit configured to calculate a data value at a position corresponding to a center point of a micro region existing within a frame of the region of interest set by the region of interest setting reception unit on an image in which the region of interest is set, by interpolation processing using a data value at a position of the center point of each of a plurality of micro regions moved at the time of the processing by the image alignment processing unit, within a frame of the region of interest corresponding to the region of interest set by the region of interest setting reception unit, for each image for an image at least subjected to the deformation processing by the image alignment processing unit, on an image other than an image in which the region of interest is set by the region of interest setting acceptance unit among the plurality of images after the processing by the image alignment processing unit and the image served as the reference, and adopt the calculated value as a data value of each virtual micro region included in the region of interest on an image.

Further, an imaging data processing program according to the third aspect of the present invention is an imaging data processing program for processing imaging data which is a set of data acquired by performing a predetermined analysis or observation in each of a plurality of micro regions within a two-dimensional measurement region on a sample, wherein the imaging data processing program performs processing of imaging data acquired for each of a plurality of samples in which observation target sites are the same or similar to each other, or imaging data acquired by different analyses or observation methods or under different parameters for one sample in which observation target sites are the same, the imaging data processing program make a computer function as:

a) an image alignment processing function part configured to perform deformation processing accompanied by a movement of a position of each micro region in an image other than an image serving as a reference for one or a plurality of acquired samples so that the same or similar sites coincide with each other with one of a plurality of images generated based on a plurality of imaging data which is a processing target served as the reference;

b) a region of interest setting reception function part configured to divide one image selected by a user among the images deformed by the image alignment processing function part into predetermined micro regions, calculate a data value corresponding to a center point of each micro region by interpolation processing using the data value at a position of the center point of each of a plurality of micro regions moved at the time of the processing by the image alignment processing function part, and display the image based on the data value calculated by the interpolation processing to allow the user to set a region of interest on the image;

c) a data value within region of interest operation function part configured to calculate a data value at a position corresponding to a center point of a micro region existing within a frame of the region of interest set by the region of interest setting reception function part on an image in which the region of interest is set, by interpolation processing using a data value at a position of the center point of each of a plurality of micro regions moved at the time of the processing by the image alignment processing function part, within a frame of the region of interest corresponding to the region of interest set by the region of interest setting reception function part, for each image for an image at least subjected to the deformation processing by the image alignment processing function part, on an image other than an image in which the region of interest is set by the region of interest setting acceptance function part among the plurality of images after the processing by the image alignment processing function part and the image served as the reference, and adopt the calculated value as a data value of each virtual micro region included in the region of interest on an image.

In any of the first to third aspects of the present invention, in the case of performing a multivariate analysis and/or a hypothesis test, or the simpler operation processing of, e.g., a mean value based on a data value corresponding to a micro region included in (or considered to be included in) the region of interest, operation processing may be performed by multiplying a data value by a weight corresponding to the ratio of the area included in the micro region when the micro regions are partially included in the region of interest instead of being entirely included. That is, for example, it may be configured such that as for the data value corresponding to the micro region in which the entire micro regions are included in the region of interest, the weight is set to 1, and as for the data value corresponding to the micro region in which only ½ of the area is included in the region of interest, the operation processing is performed by setting the weight to ½.

According to such processing, it is possible to improve the accuracy of the multivariate analysis and/or hypothesis test, or the comparative analysis and/or the differential analysis based on the result of simpler operation processing of, e.g., a mean value.

Effects of the Invention

According to the imaging data processing apparatus and the imaging data processing program of the present invention, for example, in the case of setting a region of interest on a plurality of images derived from samples to be subjected to a comparative analysis or a differential analysis, by setting the region of interest on one image by a user, it is possible to accurately set the region of interest corresponding to approximately the same site on the image in other samples. As a result, it is possible to improve the accuracy of a comparative analysis and/or a differential analysis using a data value in a micro region included in a region of interest on each image.

EMBODIMENTS FOR CARRYING OUT THE INVENTION

First Example

Hereinafter, an example of an imaging mass spectrometer using an imaging data processing apparatus according to the present invention will be described with reference to the attached drawings.

Figure 1:
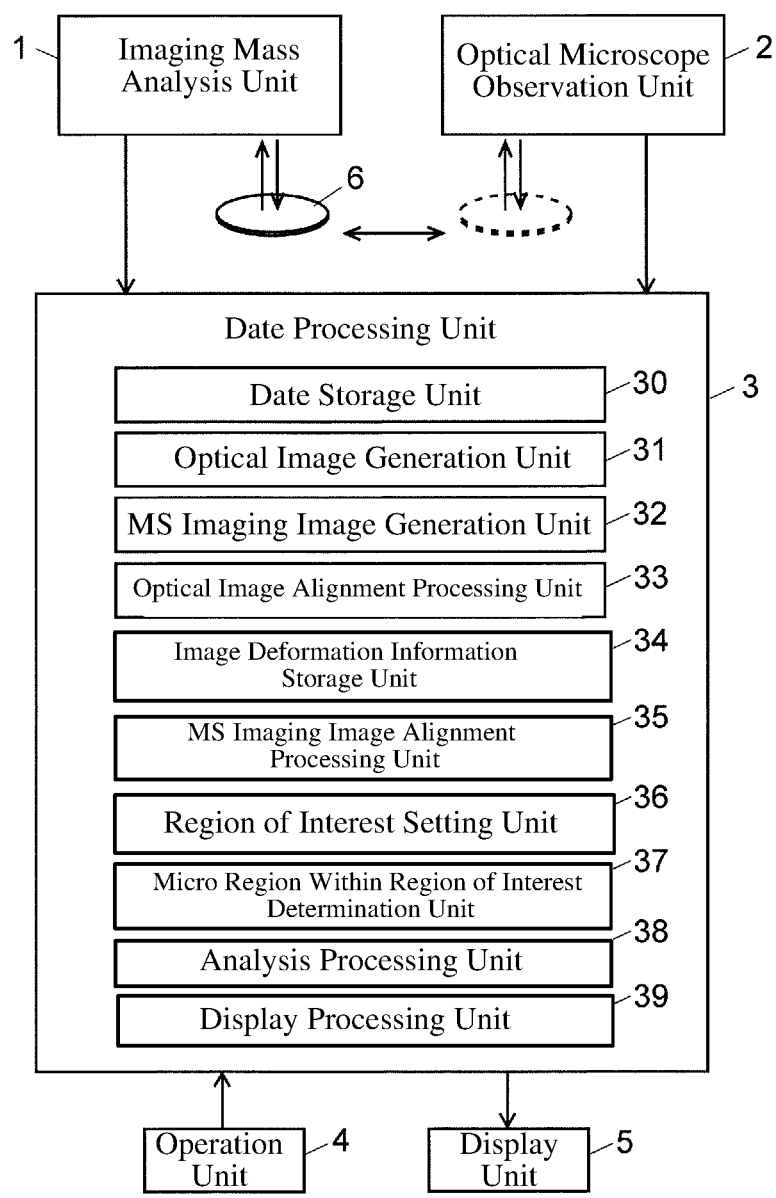
FIG. 1 is a configuration diagram of a main part of an imaging mass spectrometer of a first example using an imaging data processing apparatus according to the present invention.

FIG. 1 is a configuration diagram of a main part of an imaging mass spectrometer of a first example. The apparatus is provided with an imaging mass analysis unit 1, an optical microscope observation unit 2, a data processing unit 3, an operation unit 4, and a display unit 5. The imaging mass analysis unit 1 includes, for example, a matrix-assisted laser desorption ionization ion trap time-of-flight mass spectrometer (MALDI-IT-TOFMS), and acquires mass spectrum data (or MS$^n$ spectrum data where n is 2 or more) for each of a number of measuring points in a two-dimensional measurement region on a sample 6 such as a biological tissue section. The optical microscope observation unit 2 is configured to acquire an optical microscope image within a range including at least a measurement region on the same sample 6.

The data processing unit 3 receives the mass spectrum data for each measuring point acquired by the imaging mass analysis unit 1 (hereinafter collectively referred to as "MS imaging data") and the optical image data acquired by the optical microscope observation unit 2, and performs predetermined processing. The data processing unit 3 includes, as functional blocks, a data storage unit 30, an optical image generation unit 31, an MS imaging image generation unit 32, an optical image alignment processing unit 33, an image deformation information storage unit 34, an MS imaging image alignment processing unit 35, a region of interest setting unit 36, a micro region within region of interest determination unit 37, an analysis processing unit 38, and a display processing unit 39.

Note that the data processing unit 3 is generally a personal computer (or a higher performance workstation), and the function of each of the above-described blocks can be achieved by operating dedicated software (that is, a computer program) installed on the computer.

In the apparatus of this example, like the apparatus disclosed in Non-Patent Document 1, the imaging mass analysis unit 1 and the optical microscope observation unit 2 are integrated and is an apparatus in which a sample 6 set at a predetermined position of the apparatus can be moved between the measurement position by the imaging mass analysis unit 1 and the imaging position by the optical microscope observation unit 2 automatically or in response to a manual operation. Note that the imaging mass analysis unit 1 and the optical microscope observation unit 2 are not necessarily required to be integrated and may be configured such that a user manually can transfer a sample 6.

In the imaging mass spectrometer of this example, in the case of acquiring MS imaging data and optical image data for one sample 6, it is performed as follows. The sample 6 is a section sample excised from a liver (or other organs) of an experimental animal such as a mouse.

A user sets a sample 6, which is placed on a dedicated plate and on which no matrix is applied, at a predetermined position of the apparatus, and performs predetermined operations by the operation unit 4. Then, the optical microscope observation unit 2 captures the optical image on the sample 6 and displays the image on the screen of the display unit 5. The user confirms this image to determine a measurement region on the sample 6 and, for example, designates the measurement region by setting a frame surrounding the measurement region on the optical image by the operation unit 4. With this, the measurement region which is a target to be subjected to the imaging mass spectrometry on the sample 6 is determined. The optical image data acquired by imaging the sample 6 is stored in the data storage unit 30 together with the information specifying the position of the measurement region.

The user once removes the plate on which the sample 6 is placed from the apparatus and returns the plate to the apparatus after applying an appropriate matrix to the surface of the sample 6. Then, the user instructs the operation unit 4 to make the mass spectrometer perform mass spectrometry. Then, the imaging mass analysis unit 1 performs mass spectrometry on each of a plurality of rectangular micro regions partitioned in a grid pattern in the measurement region to acquire mass spectrum data. Consequently, a set of mass spectrum data, or MS imaging data, corresponding to the number of micro regions within the measurement region is acquired and this data is stored in the data storage unit 30. The optical image data and the MS imaging data for one sample 6 are stored in an associated manner or in the same file. Note that the spot shape of the laser beam irradiated to the sample 6 in the MALDI ion source is substantially circular (or substantially elliptical), and therefore, strictly speaking, mass spectrum information corresponding to the rectangular micro region is not acquired, but it is assumed that mass spectrum information corresponding to the rectangular micro region is acquired by emitting the laser beam having a predetermined diameter with the laser beam substantially aligned to the center point of the micro region to perform the mass spectrometry.

As described above, on a plurality of samples to be subjected to a comparative analysis, for example, a section sample cut out of a liver of a mouse that is developing cancer and a section sample cut out of a liver of a mouse that is normal, MS imaging data and optical image data are collected by performing the measurement by the imaging mass analysis unit 1 and the optical microscope observation by the optical microscope observation unit 2, respectively.

Figure 2:
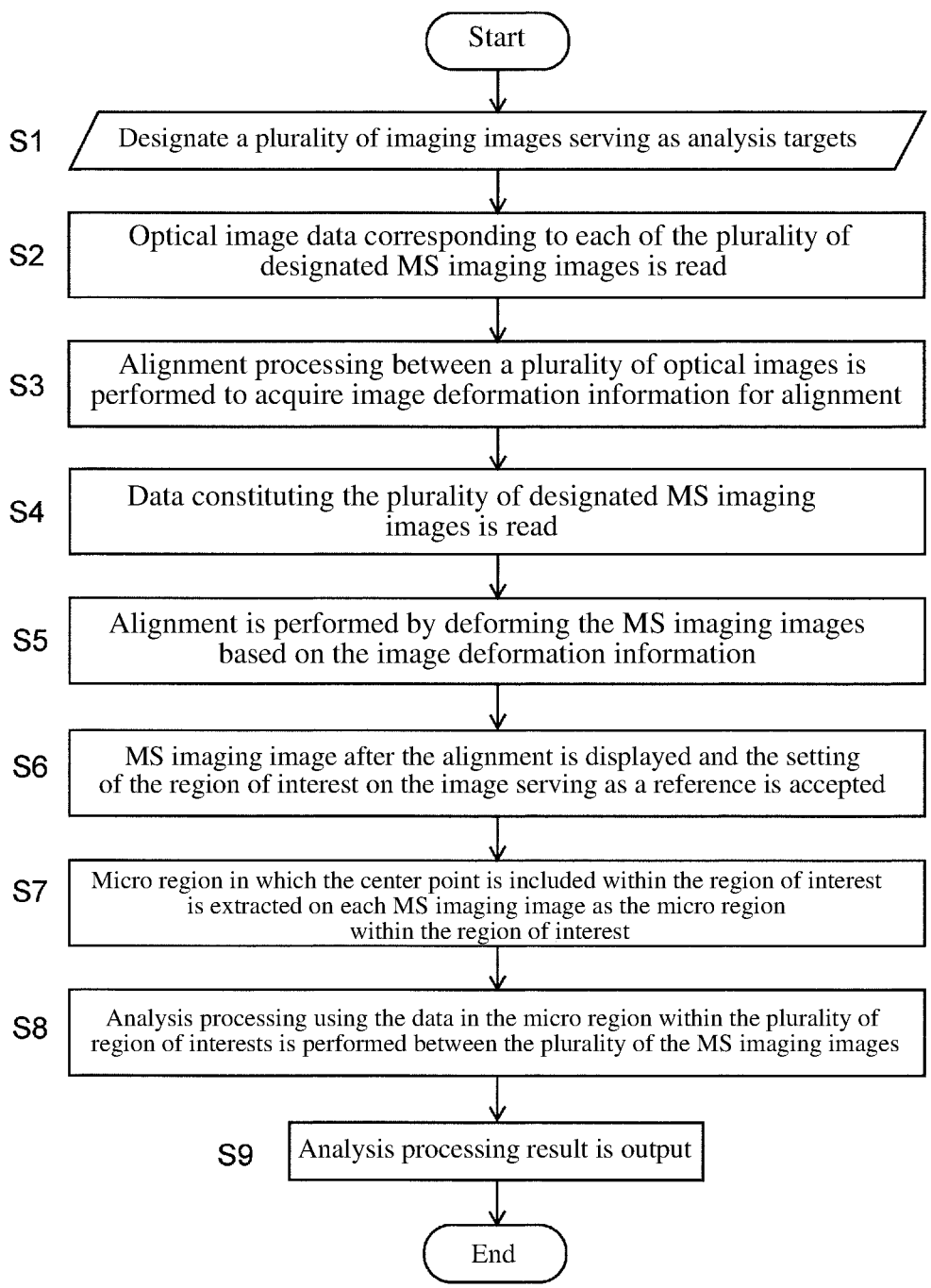
FIG. 2 is a flowchart of an analysis procedure including a characteristic region of interest setting processing in the imaging mass spectrometer of the first example.
Figure 3:
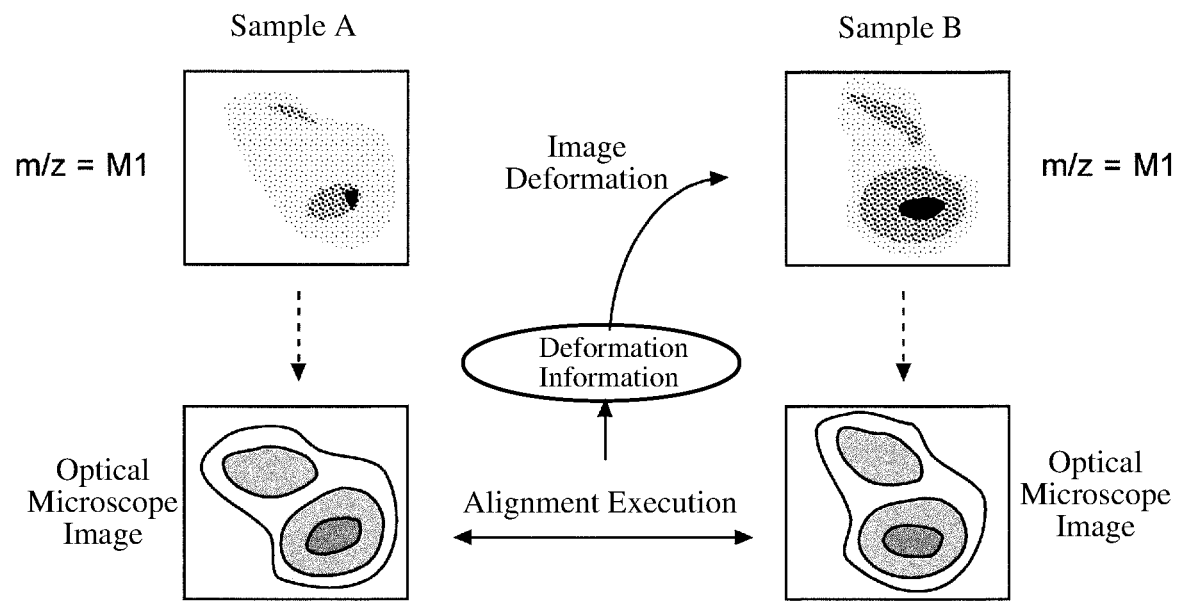
FIG. 3 is a conceptual diagram for explaining alignment processing of a plurality of MS imaging images in the imaging mass spectrometer of the first example.
Figure 4:
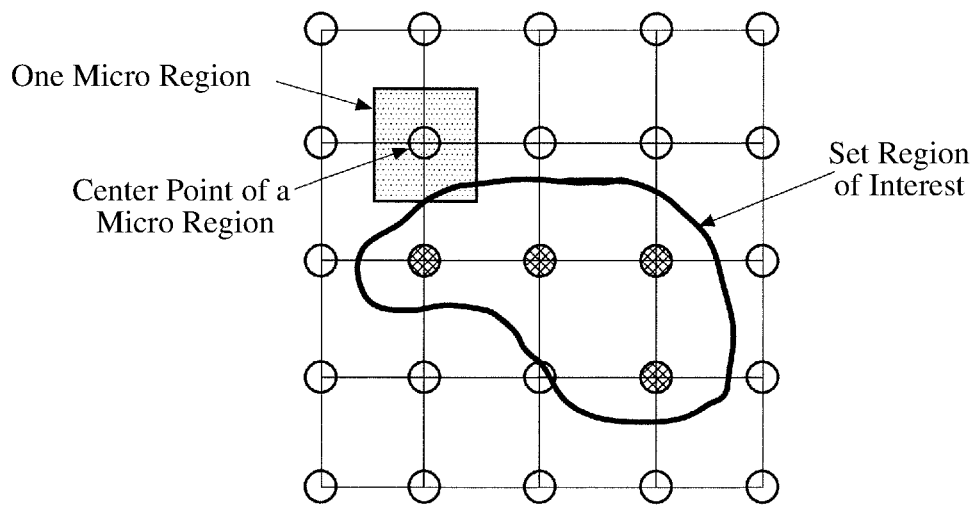
FIG. 4 is an explanatory diagram of region of interest setting processing in the imaging mass spectrometer of the first example.
Figure 5:
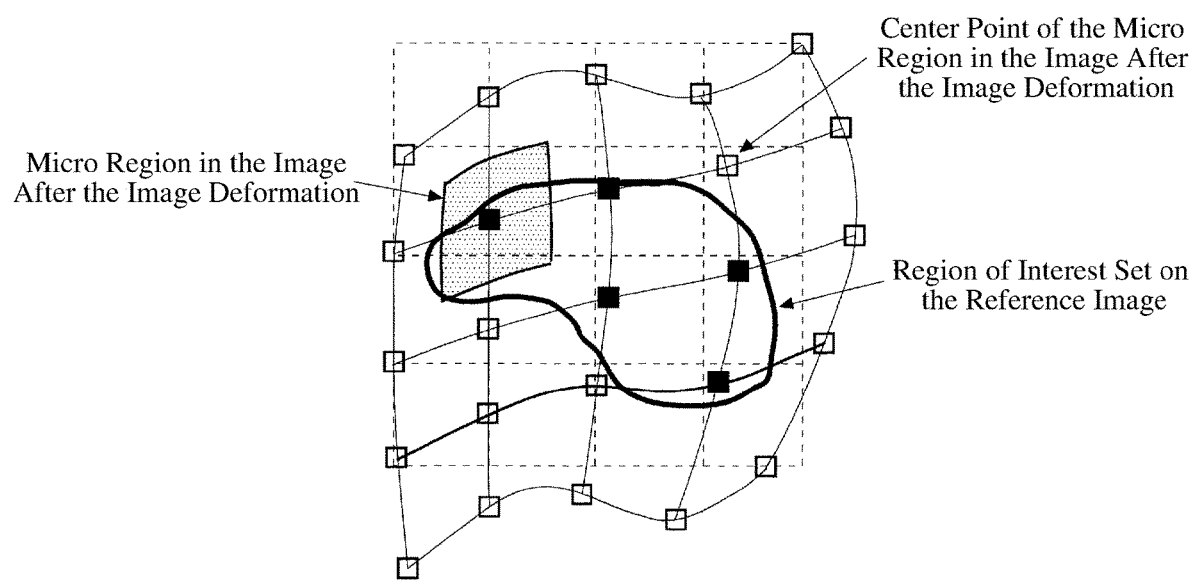
FIG. 5 is an explanatory diagram of the region of interest setting processing in the imaging mass spectrometer of the first example.

Next, the characteristic data processing performed by the data processing unit 3 for the data collected as described above will be described with reference to FIG. 2 to FIG. 5. FIG. 2 is a flowchart showing the procedures of this data processing. FIG. 3 is a conceptual diagram for explaining the alignment processing of a plurality of MS imaging images. FIG. 4 and FIG. 5 are diagrams for explaining the region of interest setting processing.

The user specifies a plurality of MS imaging images which are analysis processing targets by the operation unit 4 (Step S1). Specifically, one MS imaging image can be designated by the information that identifies a sample (e.g., a sequence number allocated to a plurality of samples) and m/value. Three or more MS imaging images may be designated, but for simplicity, a case in which two MS imaging images are designated will be described here. As an illustrative example, as shown in FIG. 3, it is assumed that the MS imaging image at m/z=M1 of a sample A and the MS imaging image at m/z=M1 of a sample B are designated as analysis processing targets. At this time, it is also assumed that a user designates which image should be served as a reference. Here, it is assumed that the MS imaging image of the sample A is served as a reference.

Note that in Step S1, as an MS imaging image, not an image indicating a signal strength distribution in a particular m/z value of one sample but an image configured by the data value calculated one by one for each m/z micro region based on the signal strength value at the entire m/z value, a particular m/z value range, or a plurality of particular m/z values may be designated. For example, a principal component analysis may be performed on the mass spectrum data acquired from each micro region within a measurement region of one sample, and an image constituted by the score value for each micro region in one typical principal component acquired by the analysis may be set as one MS imaging image. Of course, as long as one data value is acquired for each micro region, various multivariate analysis methods other than a principal component analysis can be used.

In response to the above-described designation of images in Step S1, the optical image generation unit 31 reads out optical microscope images within a measurement region corresponding to the plurality of designated MS imaging images, that is, optical image data constituting optical microscope images within approximately the same measurement region of the sample A and the sample B from the data storage unit 30 (Step S2). At this time, it may be configured such that the optical image generation unit 31 generates an optical microscope image from the read optical image data and displays it on the screen of the display unit 5.

Next, the optical image alignment processing unit 33 performs image alignment processing by appropriately deforming the optical microscope image in the sample B in accordance with a predetermined algorithm so that the position, the size, and the shape of the same site are aligned between the optical microscope image in the sample A set as a reference and the optical microscope image in the other sample B. Note that in cases where the spatial resolutions of a plurality of images which are alignment processing targets, in this instance, the sizes of the pixels of optical microscope images, are not aligned, interpolation processing or binning processing may be performed so that the size of the pixel in the other image coincides with the size of the pixel in the image served as a reference.

Various algorithms can be used for the alignment processing. For example, a method can be adopted in which a cross-correlation function between different image is acquired for each pixel value of each pixel of each optical microscope image and the position of each pixel of the other image other than the image served as a reference is shifted to deform the image so that the cross-correlation function becomes maxim. Here, as the pixel value in the optical microscope image, it is preferable to use a value acquired by synthesizing brightness values on any of color components of R, G, and B which are three primary colors of color, or brightness values on two or three color components between the three color components according to a predetermined calculation formula.

In the case of deforming an image by shifting the position of each pixel on the image, for example, it is preferable to perform an affine transformation, such as, e.g., linear movement, rotation, enlargement and reduction, and shearing, for each pixel. Also, although the affine transformation is a linear deformation, a nonlinear deformation may be performed to deform an image with higher accuracy. Specifically, as an algorithm of the alignment processing, for example, an image registration technique widely used in the medical field can be used. With this processing, the image deformation information for matching the optical microscope image in the sample B to the optical microscope image in the sample A can be acquired, and therefore this image deformation information is stored in the image deformation information storage unit 34 (Step S3).

Next, the MS imaging image generation unit 32 reads out from the data storage unit 30 the MS imaging data constituting the plurality of MS imaging images designated in Step S1 (Step S4). Then, the MS imaging image alignment processing unit 35 performs the image deformation processing that reads out the image deformation information for aligning the sample A and the sample B from the image deformation information storage unit 34 and deforms the MS imaging image not serving as a reference, i.e., the MS imaging image in the sample B, by using the image deformation information (Step S5). Note that in cases where the spatial resolutions, i.e., the sizes of the micro regions, of the plurality of MS imaging images to be targeted, are not aligned also in this alignment processing, it is desirable to perform interpolation processing or binning processing so that the size of the micro region in the other image matches the size of the micro region in the MS imaging image serving as a reference.

In this alignment processing, regardless of the pattern of the MS imaging image, each micro region in the image is appropriately moved or deformed based on a given image deformation information. In cases where the accuracy of the image deformation information acquired in Step S3 is high and the positional deviation between the optical microscope image and the MS imaging image is negligible in each sample, the MS imaging image after the image deformation have almost the same position, size, and shape in the same site. That is, the alignment of the plurality of MS imaging images can be realized with high accuracy by the image processing.

Next, the region of interest setting unit 36 displays the MS imaging image after the alignment is performed in Step S5 on the screen of the display unit 5 through the display processing unit 39, and accepts the designation of the region of interest on the MS imaging image in the sample A to be served as a reference (Step S6). Specifically, the user operates a pointing device which is a part of the operation unit 4 and draws a frame of an arbitrary shape and size on the displayed MS imaging image. As a result, the region of interest setting unit 36 recognizes the range surrounded by the frame on the MS imaging image as a region of interest.

Since the range of each micro region is not shown on the image, the range of the region of interest set by a user and the boundary of each micro region are completely irrelevant. FIG. 4 is a diagram showing an example of the relationship between the set region of interest and micro regions on the image served as a reference. Since the image served as a reference is not deformed, the micro regions are orderly arranged in a grid pattern. The micro region within region of interest determination unit 37 acquires the center point of each micro region of a rectangular shape and determines whether or not the center point exists within the range of the region of interest. The micro region in which the center point is existed within the range of the interest of region is extracted (Step S7). In FIG. 4, the center point of each micro region is indicated by a circle, the center point included within the range of region of interest is indicated by a shaded circle, and the center point not included within the range of region of interest is indicated by a blank circle. In this example, the number of the center points included within the range of the region of interest is four, and the four micro regions corresponding to these center points are assumed to be micro regions included within the region of interest.

On the other hand, since the image alignment has been performed as described above, the position (coordinate position on the image) of the region of interest can be the same as that on the image served as a reference even on the MS imaging image which is not the image served as a reference. However, in the MS imaging image which is not the image served as a reference, there is a high possibility that the position and the shape of each micro region have been made in a disorderly grid pattern due to the image deformation. FIG. 5 is a diagram showing an example of the relationship between the set region of interest and the micro region on the MS imaging image which is not the image served as a reference. Like in this example, the shape of each micro region is not rectangular and distorted, and the arrangement of the micro regions is not in an orderly grid pattern. Also for such an MS imaging image, the micro region within region of interest determination unit 37 acquires the center point of each micro region and determines whether or not the center point exists within the range of the region of interest. Then, it extracts the micro regions in which the center point exists within the range of the region of interest. In FIG. 5, the center point of each micro region is indicated by a square mark, the center point included within the range of each region of interest is indicated by a solid black square mark, and the center point not included within the range of each region of interest is indicated by a blank square mark. In this example, the number of the center points included within the range of the region of interest is five, and five micro regions corresponding to these center points are assumed to be micro regions included in the region of interest.

As can be seen by comparing FIG. 4 and FIG. 5, the range of the region of interest on the images are the same, but the micro regions included within the range of the region of interest become different because the shapes and the arrangement of the micro regions are different. In the example of FIG. 5, the number of micro regions included within the range of the region of interest is increased as compared with the number of micro regions included within the range of the region of interest on the image served as a reference, but depending on the state of the image deformation, there is a possibility that the number of micro regions is reduced. In this way, when the image deformation is made to perform the alignment of the MS imaging image for a plurality of samples, the micro regions included in the region of interest on each image can be appropriately extracted.

The analysis processing unit 38 performs a predetermined multivariate analysis or hypothesis test based on the mass spectrum data corresponding to a plurality of micro regions extracted as being included in the region of interest on a plurality of MS imaging images (Step S8). Then, the analysis result is displayed on the display unit 5 through the display processing unit 39 (Step S9). It is possible to perform a multivariate analysis and/or a hypothesis test based on the mass spectrum data acquired for the micro region included within the range of the region of interest set by a user. As a result, a highly accurate multivariate analysis and hypothesis test can be performed.

Second Example

Figure 6:
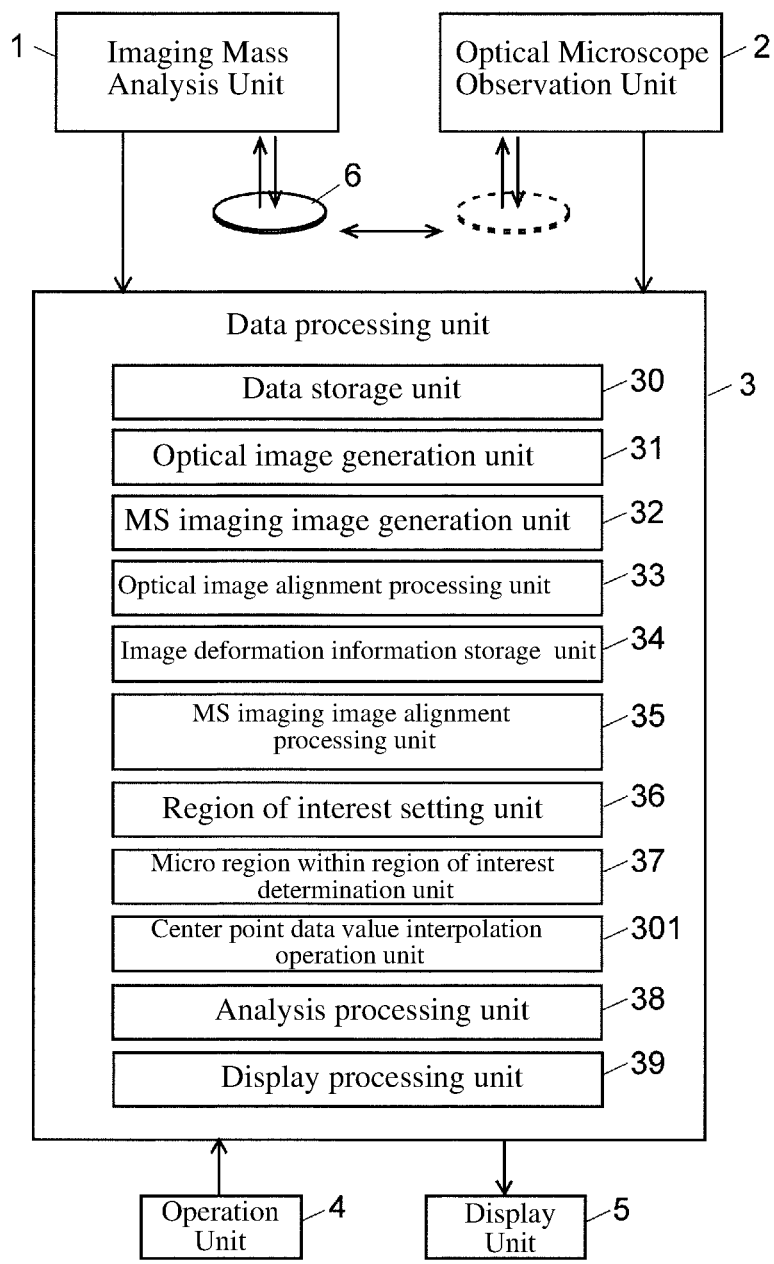
FIG. 6 is a configuration diagram of a main part of an imaging mass spectrometer of a second example using an imaging data processing apparatus according to the present invention.
Figure 7:
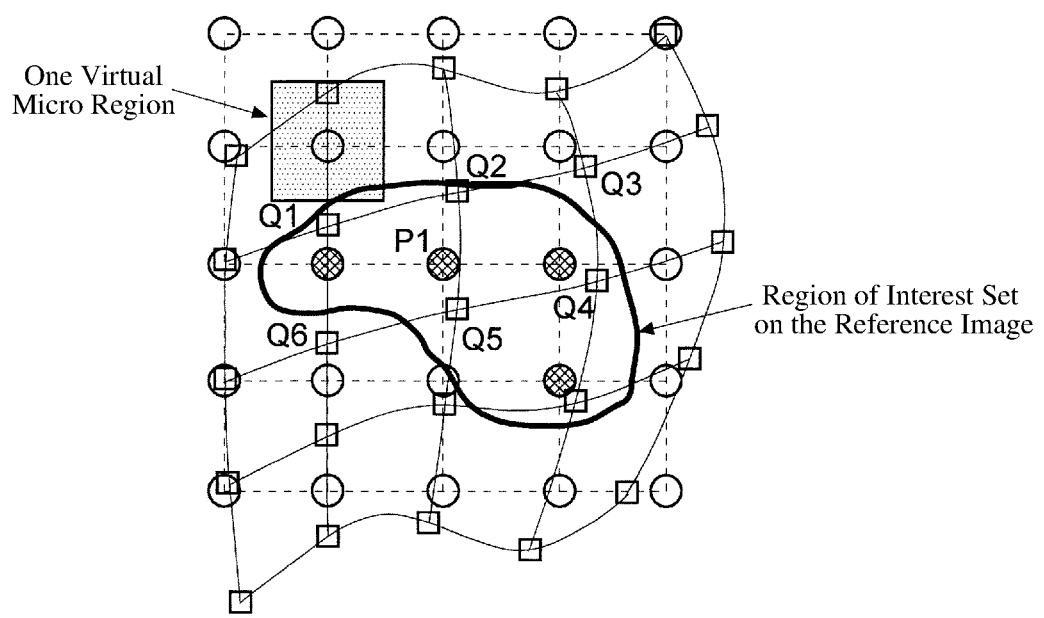
FIG. 7 is an explanatory diagram of region of interest setting processing in the imaging mass spectrometer of the second example.

Another example of an imaging mass spectrometer using an imaging data processing apparatus according to the present invention will be explained with reference to the attached drawings. FIG. 6 is a configuration diagram of a main part of an imaging mass spectrometer of a second example. FIG. 7 is an explanatory diagram of region of interest setting processing in an imaging mass spectrometer of the second example. In FIG. 6, the same components as those in the imaging mass spectrometer of the first example shown in FIG. 1 are allotted by the same reference numerals. The imaging mass spectrometer of this second example has substantially the same constituent elements as the imaging mass spectrometer of the first example, but differs from the first example in that the data processing unit 3 has a center point data value interpolation calculation unit 301. The characteristic operation of the imaging mass spectrometer of the second example will be described focusing on this difference.

As for the processing of Steps S1 to S6 in the flowchart shown in FIG. 2, i.e., the image alignment or the setting of the region of interest on the image, the operation in the imaging mass spectrometer of this second example is exactly the same as that of the imaging mass spectrometer of the first example. Further, the features that the micro region within region of interest determination unit 37 determines whether or not the center point of each micro region of a rectangular shape exists within the range of the region of interest on the image served as a reference and micro regions in which the center point exists within the range of the region of interest are extracted are the same as those of the first example. In the imaging mass spectrometer of the second example, the subsequent processing differs from that of the first example.

As a matter of course, also in this case, there is a high possibility that the positions and shapes of micro regions have become in a disorderly grid pattern due to the image deformation in the MS imaging image which is an image not served as a reference. FIG. 7 is a diagram showing an example of the relationship between the set region of interest and the micro regions on the MS imaging image which is not the image served as a reference. Here, the micro region within region of interest determination unit 37 assumes that rectangular micro regions (herein referred to as a virtual micro region because no actual micro region exists) are arranged in an orderly manner even on the MS imaging image which is an image not served as a reference in the same manner as in the image served as a reference described above.

In FIG. 7, the center point of the virtual micro region is indicated by a circle. The center point data value interpolation calculation unit 301 calculates the mass spectrum data in the virtual micro region in which the center point is included in the region of interest by the interpolation processing of the mass spectrum data in the plurality of image deformed micro regions near the center point. Of course, if only the signal strength value in a particular m/z value is needed, it is enough to calculate only the signal strength value by the interpolation processing. Further in cases where a calculation value such as a score value of a particular principal component in the principal component analysis is required, it is enough to acquire the calculation value by the interpolation processing.

Specifically, for example, in FIG. 7, the mass spectrum data in the virtual micro region having the center point P1 is calculated by the interpolation processing based on the mass spectrum data in the micro regions having six center points Q1 to Q6 surrounding the center point. At the time of performing this interpolation processing, it is advisable to perform calculations reflecting the differences in distance between the center point P1 and the center points Q1 to Q6. Similarly, the mass spectrum data is acquired by the interpolation processing for all the virtual micro regions in which the center point is included in the region of interest, and the result is treated as equivalent to the mass spectrum data of each micro region included in the region of interest in the image served as a reference.

Note that it also may be configured such that instead of acquiring the interpolation value corresponding to the virtual micro regions in accordance with the micro regions on the MS imaging image serving as a reference, an interpolation value for each virtual micro region in each MS imaging image in accordance with a two-dimensional array of completely separate micro regions, which differs from either the MS imaging image serving as a reference or the MS imaging image not serving as a reference.

In any of the above-described examples, the mass spectrum data acquired for the micro region or the virtual micro region in which the center point exists within the range of the region of interest, the signal strength value in the specific m/z value, the score value of the specific principal component, or the like are directly used for a multivariate analysis or a hypothesis test, but the numerical values used for the multivariate analysis or the hypothesis test may be weighted according to the area of the micro region included within the range of the region of interest. That is, it may be configured such that when the entire micro region is included within the range of the region of interest, the weighting factor is set to 1, and when only a part of the micro region is included within the range of the region of interest, the weighting factor corresponding to the ratio of the area included is determined, and the multivariate analysis and the hypothesis test corresponding to the weighting factor are calculated. This makes it possible to perform the analysis with higher accuracy.

Various Modifications

In the first and second examples described above, the image deformation information acquired by the alignment of the optical microscope image was used for the alignment of the MS imaging image. This is because it is often difficult to perform the satisfactory alignment based on the pattern of the distribution observed on the MS imaging image. Therefore, in cases where a satisfactory alignment can be performed with the pattern of the distribution observed on a plurality of MS imaging images, it is unnecessary to use the image deformation information acquired by the alignment of the optical microscope image, and it is unnecessary to perform the processing of Steps S2 and S3 in FIG. 2.

Further, in the first and second examples described above, it is configured to be able to set the region of interest on the image served as a reference in which the deformation processing has not been made, but it may be configured to be able to set the region of interest on the deformed image. However, since the shape of the micro region becomes non-rectangular by the image deformation, if the image is generated as it is based on the data value of the original micro region, the image may become unnatural, for example, the image may be distorted. Therefore, it may be configured such that the data value corresponding to the micro region of the rectangular shape is apparently acquired by the same interpolation as described in the second example without generating the image as it is based on the data value of the original micro region, and the image generated based on the data value is displayed.

In the first and second examples, it is assumed that the imaging mass analysis unit 1 and the optical microscope observation unit 2 are substantially integrated and that the optical microscope image and the MS imaging image of each sample are substantially accurately aligned (without substantial positional deviation). However, in an apparatus in which the imaging mass analysis unit 1 and the optical microscope observation unit 2 are not integrated, there are many cases in which the positional relationship between the optical microscope image and the MS imaging image are not accurately aligned. Therefore, in such an apparatus, in the data acquired for each sample, first, image alignment processing as described above is performed between the optical microscope image and the MS imaging image, and then the image alignment processing is performed between the sample A and the sample B. Further, the image alignment between the optical microscope image and the MS imaging image may be performed in the sample A, and further the image alignment may be performed between the MS imaging image of the sample B and the optical microscope image of the sample A.

When the positional relationship between the optical microscope image and the MS imaging image is matched as described above, or when the image alignment is performed between the optical microscope image and the MS imaging image, the optical microscope image may be displayed so that the setting of the region of interest can be performed on the image. In this case, the MS imaging image may be used as a reference, and the optical microscope image may be modified to suit this, and the image may be displayed to set the region of interest.

The first and second examples are examples in which the imaging data processing apparatus according to the present invention is applied to an imaging mass spectrometer, but the apparatuses and systems to which the present invention can be applied are not limited thereto.

That is, the imaging data to be processed by the present invention may be data in each of a plurality of micro regions within a two-dimensional measurement region on a sample, acquired by various microscopes, such as, e.g., an optical microscope, a phase contrast microscope, a confocal microscope, a Fourier Transform Infrared Spectrophotometry (FTIR) imaging apparatus, a Raman spectroscopic imaging apparatus, an electron probe micro analyzer (EPMA), etc.

The imaging data to be subjected to the image alignment may be data of different analytical methods. For example, in the first and second examples described above, an example is shown in which the image alignment is performed between MS imaging images and between an optical microscope image and an MS imaging image, but it may be configured such that the image alignment is performed between a Raman spectroscopic imaging image and an MS imaging image measured for the same sample, and the region of interest is set on either image. Other than the above, the above-described data processing may be applied to the imaging images acquired by performing measurements on the same sample by the above-described plurality of imaging apparatuses, or to the imaging images acquired by performing measurements on a plurality of samples by the above-described plurality of imaging apparatus.

It should further be noted that the above-described examples and modifications are merely examples of the present invention, and it is needless to say that any modifications, changes, and additions performed within the range of the gist of the present invention are covered by the claims of the present application.

DESCRIPTION OF SYMBOLS

1: Imaging mass analysis unit
2: Optical microscope observation unit
3: Data processing unit
30: Data storage unit
31: Optical image generation unit
32: MS imaging image generation unit
33: Optical image alignment processing unit
34: Image deformation information storage unit
35: MS imaging image alignment processing unit
36: Region of interest setting unit
37: Micro region within region of interest determination unit
38: Analysis processing unit
39: Display processing unit
301: Center point data value interpolation calculation unit
4: Operation unit
5: Display unit
6: Sample

The invention claimed is:

1. An imaging data processing apparatus for processing imaging data sets, each processing imaging data set forming a corresponding first image of the sample and comprising a set of data acquired by performing a predetermined analysis or observation in each of a plurality of micro regions within a two-dimensional measurement region on a corresponding sample, wherein the imaging data sets are acquired for each of a plurality of samples in which from observation target sites of the sample, or acquired by different analyses or observation methods or under different parameters for an observation target site of one sample, the imaging data processing apparatus comprising:

a) an image alignment processing unit configured to obtain image deformation information by performing deformation processing of one or more optical images corresponding to the first images to generate one or more corresponding deformed optical images, so that observation target sites represented in the optical images coincide with each other, and perform deformation processing of the one or more of the first images to generate one or more corresponding second images by using the image deformation information obtained by the optical image corresponding to the first image, each second image providing a shift of a position of one or more of the micro regions with respect to their position in the corresponding first image;

b) a region of interest setting unit configured to obtain a user input to set a region of interest on a reference image, the reference image comprising one of the first images or one of the second images and to set a region of interest on each of the second images that is not the reference image based on the setting of the region of interest on the reference image; and c) a region of interest correspondence determination unit configured to determine which micro regions of the second images are included in the region of interest of each second image by determining if a center point of each micro region of the second image exists within the region of interest of the second image.

2. An imaging data processing apparatus for processing imaging data sets, each processing imaging data set forming a corresponding first image of the sample and comprising a set of data acquired by performing a predetermined analysis or observation in each of a plurality of micro regions within a two-dimensional measurement region on a corresponding sample, wherein the imaging data sets are acquired for each of a plurality of samples from observation target sites of the sample, or acquired by different analyses or observation methods or under different parameters for an observation target site of one sample, the imaging data processing apparatus comprising:

a) an image alignment processing unit configured to perform deformation processing of one or more of the first images to generate one or more corresponding deformed images, each deformed image providing shift of a position of one or more of the micro regions with respect to their position in the corresponding first image so that observation target sites represented in the first images coincide with each other;

b) a region of interest setting unit configured to obtain a user input to set a region of interest on a reference image, the reference image comprising one of the first images or one of the deformed images and to set a region of interest on each of the deformed images that is not the reference image based on the setting of the region of interest on the reference image; and c) a data value within region of interest operation unit configured to calculate, for each deformed image, data values at positions corresponding to center points of a plurality of virtual micro regions existing within the region of interest set by the region of interest setting unit on the deformed image, each data value being calculated by interpolation processing using data values at center points of at least some the micro regions as shifted in the deformed image due to the processing by the image alignment processing unit, and configured to adopt the calculated data values as the data value of each virtual micro region included in the region of interest set on the deformed image.

3. An imaging data processing apparatus for processing imaging data sets, each processing imaging data set forming a corresponding first image of the sample and comprising a set of data acquired by performing a predetermined analysis or observation in each of a plurality of micro regions within a two-dimensional measurement region on a corresponding sample, wherein the imaging data sets are acquired for each of a plurality of samples from observation target sites of the sample, or acquired by different analyses or observation methods or under different parameters for an observation target site of one sample, the imaging data processing apparatus comprising:

a) an image alignment processing unit configured to perform deformation processing of one or more of the first images to generate one or more corresponding deformed images, each deformed image providing a shift of a position of one or more of the micro regions with respect to their position in the corresponding first image so that observation target sites represented in the first images coincide with each other;

b) a region of interest setting unit configured to divide a selected deformed image selected by a user among the deformed images into predetermined micro regions, and for each of the predetermined micro regions, obtain a corresponding data value corresponding to a center point of the predetermined micro region by an interpolation processing using data values at center points of at least some of the micro regions as shifted in the selected deformed image due to the deformation processing by the image alignment processing unit, and display the image based on the data value calculated by the interpolation processing to allow the user to set a region of interest on the selected deformed image;

c) a data value within region of interest operation unit configured to calculate, for each deformed image, data values at positions corresponding to center points of a plurality of virtual micro regions existing within a region of interest set by the region of interest setting on the deformed image, each data value being calculated by interpolation processing using data values at center points of at least some the micro regions as shifted in the deformed image due to the processing by the image alignment processing unit, and configured to adopt the calculated data values as the data value of each virtual micro region included in the region of interest set on the deformed image.

4. A non-transitory computer-readable recording medium storing an imaging data processing program for processing imaging data sets, each processing imaging data set forming a corresponding first image of the sample and comprising a set of data acquired by performing a predetermined analysis or observation in each of a plurality of micro regions within a two-dimensional measurement region on a corresponding sample, wherein the imaging data sets are acquired for each of a plurality of samples from observation target sites of the sample, or acquired by different analyses or observation methods or under different parameters for an observation target site of one sample, the imaging data processing program causing a computer to function as:

a) an image alignment processing function part configured to obtain image deformation information by performing deformation processing of one or more optical images corresponding to the first images to generate one or more corresponding deformed optical images, so that observation target sites represented in the optical images coincide with each other, and perform deformation processing of the one or more of the first images to generate one or more corresponding second images by using the image deformation information obtained by the optical image corresponding to the first image, each second image providing a shift of a position of one or more of the micro regions with respect to their position in the corresponding first image;

b) a region of interest setting function part configured to obtain a user input to set a region of interest on a reference image, the reference image comprising one of the first images or one of the second images and to set a region of interest on each of the second images that is not the reference image based on the setting of the region of interest on the reference image; and c) a region of interest correspondence determination function part configured to determine which micro regions of the second images are included in the region of interest of each second image by determining if a center point of each micro region of the second image exists within the region of interest of the second image.

5. A non-transitory computer-readable recording medium storing an imaging data processing program for processing imaging data sets, each processing imaging data set forming a corresponding first image of the sample and comprising a set of data acquired by performing a predetermined analysis or observation in each of a plurality of micro regions within a two-dimensional measurement region on a corresponding sample, wherein the imaging data sets are acquired for each of a plurality of samples from observation target sites of the sample, or acquired by different analyses or observation methods or under different parameters for an observation target site of one sample, the imaging data processing program causing a computer to function as:

a) an image alignment processing function part configured to perform deformation processing of one or more of the first images to generate one or more corresponding deformed images, each deformed image providing a shift of a position of one or more of the micro regions with respect to their position in the corresponding first image so that observation target sites represented in the first images coincide with each other;

b) a region of interest setting function part configured to obtain a user input to set a region of interest on a reference image, the reference image comprising one of the first images or one of the deformed images and to set a region of interest on each of the deformed images that is not the reference image based on the setting of the region of interest on the reference image; and c) a data value within region of interest operation function part configured to calculate, for each deformed image, data values at positions corresponding to center points of a plurality of virtual micro regions existing within the region of interest set by the region of interest setting function part on the deformed image, each data value being calculated by interpolation processing using data values at center points of at least some the micro regions as shifted in the deformed image due to the processing by the image alignment processing function part, and configured to adopt the calculated data values as the data value of each virtual micro region included in the region of interest set on the deformed image.

6. A non-transitory computer-readable recording medium storing an imaging data processing program for processing imaging data sets, each processing imaging data set forming a corresponding first image of the sample and comprising a set of data acquired by performing a predetermined analysis or observation in each of a plurality of micro regions within a two-dimensional measurement region on a corresponding sample, wherein the imaging data sets are acquired for each of a plurality of samples from observation target sites of the sample, or acquired by different analyses or observation methods or under different parameters for an observation target site of one sample, the imaging data processing program causing a computer to function as:

a) an image alignment processing function part configured to perform deformation processing of one or more of the first images to generate one or more corresponding deformed images, each deformed image providing a shift of a position of one or more of the micro regions with respect to their position in the corresponding first image so that observation target sites represented in the first images coincide with each other;

b) a region of interest setting function part configured to divide a selected deformed image selected by a user among the deformed images into predetermined micro regions, and for each of the predetermined micro regions, obtain a corresponding data value corresponding to a center point of the predetermined micro region by an interpolation processing using data values at center points of at least some of the micro regions as shifted in the selected deformed image due to the deformation processing by the image alignment processing function part, and display the image based on the data value calculated by the interpolation processing to allow the user to set a region of interest on the selected deformed image;

c) a data value within region of interest operation function part configured to calculate, for each deformed image, data values at positions corresponding to center points of a plurality of virtual micro regions existing within a region of interest set by the region of interest setting function part on the deformed image, each data value being calculated by interpolation processing using data values at center points of at least some the micro regions as shifted in the deformed image due to the processing by the image alignment processing function part, and configured to adopt the calculated data values as the data value of each virtual micro region included in the region of interest set on the deformed image.

* * * * *